US 8,945,489 B2
Feb. 3, 2015

(12) United States Patent
Bowell et al.

(10) Patent No.: US 8,945,489 B2
(45) Date of Patent: Feb. 3, 2015

(54) METAL RECOVERY PROCESS

(75) Inventors: Robert John Bowell, Cardiff (GB);
Keith Phillip Williams, Cardiff (GB);
Brian Matthew Dey, Cardiff (GB)

(73) Assignee: Minex Technologies Limited (GB)

( * ) Notice: Subject to any disclaimer, the term of this patent is extended or adjusted under 35 U.S.C. 154(b) by 21 days.

(21) Appl. No.: 13/144,774

(22) PCT Filed: Jan. 15, 2010

(86) PCT No.: PCT/GB2010/050062
§ 371 (c)(1),
(2), (4) Date: Jan. 25, 2012

(87) PCT Pub. No.: WO2010/082065
PCT Pub. Date: Jul. 22, 2010

(65) Prior Publication Data
US 2012/0114539 A1    May 10, 2012

(30) Foreign Application Priority Data

Jan. 16, 2009  (GB) .................................. 0900677.6

(51) Int. Cl.
| | |
|---|---|
| *C22B 5/00* | (2006.01) |
| *C25C 1/00* | (2006.01) |
| *C01G 49/00* | (2006.01) |
| *C22B 1/08* | (2006.01) |
| *C22B 1/10* | (2006.01) |
| *C22B 7/00* | (2006.01) |
| *C22B 7/04* | (2006.01) |
| *C22B 13/02* | (2006.01) |
| *C22B 15/00* | (2006.01) |
| *C22B 19/28* | (2006.01) |
| *C22B 19/30* | (2006.01) |

(52) U.S. Cl.
CPC ... *C22B 1/08* (2013.01); *C22B 1/10* (2013.01); *C22B 7/002* (2013.01); *C22B 7/04* (2013.01); *C22B 13/025* (2013.01); *C22B 15/006* (2013.01); *C22B 19/28* (2013.01); *C22B 19/30* (2013.01)

USPC .................. 423/38; 423/39; 423/60; 423/91; 423/96; 423/97; 423/107; 423/108; 423/135; 423/138; 423/179; 75/726; 205/367; 205/620

(58) Field of Classification Search
USPC ............... 423/38–40, 97, 107, 108, 179, 539, 423/240 R, 60, 91, 96, 135, 138; 75/726; 205/367, 620
See application file for complete search history.

(56) References Cited

U.S. PATENT DOCUMENTS

| | | | | |
|---|---|---|---|---|
| 1,414,491 | A | * | 5/1922 | Welch ............................ 423/44 |
| 3,649,245 | A | * | 3/1972 | Colombo et al. ............... 75/433 |
| 3,892,639 | A |   | 7/1975 | Leavenworth, Jr. et al. |

FOREIGN PATENT DOCUMENTS

| | | | |
|---|---|---|---|
| GB | 210011 | * | 1/1924 |
| GB | 309307 |   | 4/1929 |
| GB | 737889 |   | 10/1955 |
| GB | 780980 |   | 8/1957 |
| GB | 813293 |   | 5/1959 |
| GB | 821922 |   | 10/1959 |
| GB | 862392 |   | 3/1961 |
| GB | 1186836 |   | 4/1970 |
| GB | 1203967 |   | 9/1970 |
| WO | 9729214 |   | 8/1997 |
| ZA | 97/1032 | * | 9/1997 |

OTHER PUBLICATIONS

International Search report regarding PCT/GB2010/050062, issued Jun. 25, 2010, 15 pages.
Search report regarding Application No. GB0900677.6 issued Jul. 6, 2009, 4 pages.

* cited by examiner

*Primary Examiner* — Steven Bos

(57) ABSTRACT

A process for recovering a metal chloride or mixed metal chloride from a solid waste material comprising recoverable metal containing constituents produced by lead, copper or zinc smelting and refining processes, said process comprising the steps of: (i) heating the solid waste material; (ii) treating the heated material of step (i) with a gaseous chloride to form a gaseous metal chloride containing product; and (iii) treating the gaseous metal chloride containing product of step (ii) to recover the metal chloride or mixed metal chloride. The metal chloride may be further treated to extract the metal itself.

20 Claims, 1 Drawing Sheet

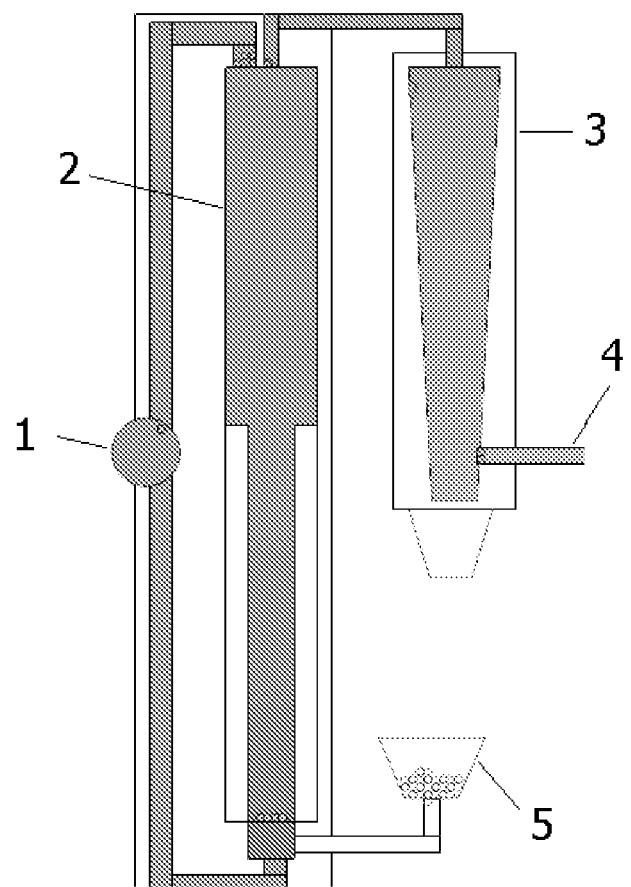

METAL RECOVERY PROCESS

FIELD OF THE INVENTION

The present invention relates to a process for recovering a metal from metallurgical waste such as process slag waste produced during smelting and refining processes. In particular, the invention relates to a process for recovering a metal of interest in the form of a metal chloride from slag waste materials produced in base metal smelting and refining processes and optionally subsequently extracting the metal from the metal chloride.

BACKGROUND OF THE INVENTION

When metalliferous ore deposits are formed in the Earth's crust they are rarely composed of just one metalliferous element; indeed it is well documented that certain combinations of metals commonly occur together. For example lead deposits are commonly associated with zinc and so as the lead concentrate is formed at the mine processing plant, zinc is inherently present in the concentrate as an impurity. It is not until the primary metal is won from the concentrate at a smelter that the impurities are removed.

Many methods are known for extracting metals and their compounds from ores, including methods which involve liberating the metal in the form of its chloride. Such methods have not previously been applied to the recovery of metals such as zinc from slag wastes, reflecting the very different nature of these materials.

Due to the high energy nature of their formation, slag wastes are generally very stable and so do not readily release metal constituents present. In general, therefore, metal impurities entrapped within the slag waste from the smelter are rarely regarded as a commodity and only low capital processing techniques, such as hydrometallurgical processes, have been exploited in order to realise their value. However, these processes are not selective and this indiscriminate dissolution of all the waste often creates further complications in realising the value of the material. A particular problem is the ready leaching of iron that commonly occurs in much greater volume than other metals of interest.

There therefore remains a continuing need for the development of further, improved, commercially viable methods for recovering metals of interest from slag waste material.

SUMMARY OF THE INVENTION

According to a first aspect, the present invention provides a process for recovering a metal chloride or mixed metal chloride from a solid waste material comprising recoverable metal containing constituents produced by lead, copper or zinc smelting and refining processes, said process comprising the steps of:—
(i) heating the solid waste material;
(ii) treating the heated material of step (i) with a gaseous chloride to form a gaseous metal chloride containing product; and
(iii) treating the gaseous metal chloride containing product of step (ii) to recover the metal chloride or mixed metal chloride.

The invention also provides a process for recovering a metal from a solid waste material comprising recovering the metal in the form of a metal chloride or mixed metal chloride from a solid waste material according to the first aspect of the invention and extracting the metal from the metal chloride or chlorides.

The present invention is based on the finding that valuable metal containing constituents contained in slag wastes which would otherwise not be recoverable in a cost effective way or at commercially viable levels may be obtained by converting the constituents into volatile metal chlorides which can then be recovered and further treated to extract the metal itself. An advantage of converting the metal constituent to a metal chloride in the metal recovery process is that as metal chlorides generally have lower vapourisation temperatures than other metal compounds such as oxides and the pure metals, less energy will be required to volatilise them, rendering the overall recovery process economically more attractive.

DETAILED DESCRIPTION

The method of the invention is applicable to the recovery of metals chlorides from a variety of smelter slag wastes and may suitably be applied to any slag waste from lead, copper or zinc smelting or refining processes which has sufficiently high levels of metal containing constituents of interest to be economically worthwhile recovering.

It will be appreciated, of course, that the composition and levels of potentially recoverable metal containing constituents will vary considerably depending on the origin of the slag waste. As discussed above, slag wastes from lead smelting processes commonly comprise zinc containing constituents, typically in the form of oxides and silicates for example. Other valuable metals which are commonly found in lead smelter slags include iron, copper, silver, indium, gold, molybdenum, tin, gallium and germanium. As copper deposits are commonly associated with nickel, copper smelter slags are a useful potential source of nickel compounds. The method of the present invention therefore affords the possibility of recovering a wide variety of valuable metals of interest.

Heating of the solid waste material in the process according to the invention may conveniently be performed in a fluidised bed reactor. The fluidised bed reactor will desirably be provided with heat insulation to keep the solid material molten. It will be appreciated that the solid feed material should be of an appropriate size so as to permit fluidisation with the bed of the reactor; large particles may require screening and crushing, whereas finer materials may require agglomeration. Typically, the fluidised bed will be maintained with compressed air to ensure a homogenous bed.

In one embodiment, the solid feed material additionally comprises a small proportion of sulfide-containing minerals, generally no more than 20% weight/weight of the solid material, typically in the order of 10% to 20% weight/weight.

Upon heating, the sulphides are oxidised to sulfates, liberating heat energy which can be used to heat the fluidised bed. The sulfide-containing minerals therefore act as a fuel source to help maintain the temperature within the fluidised bed reactor, thereby providing savings in heating costs. As the majority of base metals mined from around the world derive from sulfide deposits and indeed most smelter feed stocks are sulfide based, providing a sulfide supply to the smelter site does not generally present operational difficulties.

Sulfur dioxide gas generated by the oxidation of sulfide minerals can be recovered from the reactor vessel and this can then be converted into sulfuric acid using conventional techniques. Sulfur dioxide and sulphuric acid therefore represent commercially valuable by-products of the process of the present invention and their preparation constitutes another aspect of the invention.

The temperature to which the solid material is heated in the process according to the invention will depend on the particular waste material to be treated and the desired metal chlorides to be recovered. It will be appreciated that the solid feed material must be heated to a temperature which is sufficiently high to ensure that reaction of the metal containing constituents present to form volatile metal chlorides can take place at a practicable rate. Generally, this will be achieved by maintaining the temperature of the solid material at a temperature which is at or above the vaporisation temperature of the metal chloride to be recovered. Where the solid waste material comprises more than one metal for recovery then it should, of course, be heated to a temperature at or above the vaporisation temperature of the least volatile metal chloride to be recovered. Typically, temperatures in the region of 700° C. to 1600° C. are required, generally 700° C. to 900° C.

The gaseous chloride for use in the process according to the invention may suitably be a chloride which ordinarily occurs in gaseous form, such as hydrogen chloride, or one which is readily volatilised, such as ammonium chloride. In one embodiment, the gaseous chloride is hydrogen chloride gas.

Hydrogen chloride gas for use in the process of the invention may conveniently be prepared by conventional methods, for example by electrolysis of a brine solution to produce hydrogen and chlorine gases which are then combined to produce hydrogen chloride gas. A commercially useful by-product of this process is sodium hydroxide, the preparation of which represents another aspect of the invention.

In one embodiment, the hydrogen and chlorine gases are combined to produce hydrogen chloride gas prior to treating the heated solid material. In another embodiment, the hydrogen and chlorine gases are brought into contact upon treating the heated solid material.

Treatment of the solid material with the gaseous chloride is conveniently brought about by bringing the heated solid material into contact with a stream of the gaseous chloride. Depending on the efficiency of the reaction to form the gaseous metal chloride product, it may be appropriate to recirculate the stream of gaseous chloride within the reaction vessel, so as to optimise the amount of gaseous metal chloride containing product formed per unit of gaseous chloride consumed.

The formation of gaseous metal chloride-containing product may be conducted continuously, for example by continuously replenishing the supply of gaseous chloride and the supply of solid material in the reaction vessel.

In one embodiment, the solid material is heated in a fluidised bed reactor and gaseous chloride is fed into the base of the reactor. In order to optimise the usage of the extracting gas and to maintain the fluidised bed, the gas may optionally be recirculated within the reactor vessel.

Depending on the composition of the solid material and the temperature to which it is heated, one or more gaseous metal chloride products will be produced following treatment with the gaseous chloride.

The gaseous metal chloride containing product produced by treating the heated solid waste material with the gaseous chloride is then further treated to recover the metal chloride or mixed metal chloride. The recovered metal chloride or mixed metal chloride may optionally then itself be further refined to extract the metal itself.

In one embodiment, the gaseous metal chloride containing product is treated to recover the metal chloride or chlorides by quenching with water, thereby forming an aqueous solution of the metal chloride or chlorides.

Conveniently, a venturi scrubber or other such similar conventional technology may be used in conjunction with a packed cascading tower in order to maximise dissolution of the metal chlorides into water.

Metal chlorides with low solubilities, such as lead chloride, will naturally precipitate out during the water quenching process. By raising the pH of the aqueous metal chloride solution in a controlled manner, phased precipitation of basic metal compounds such as metal hydroxides may be obtained. The metal hydroxides thus obtained may subsequently be dried to provide the corresponding metal oxides.

By adjusting the pH of the solution to the range pH 2 to 4 typically, any iron that has been extracted can be removed from solution. Any copper present can then be cemented from solution as a pure copper metal precipitate by the addition of elemental zinc. The zinc dissolves preferentially to the copper and so the copper is removed from solution. Finally, the zinc can either be precipitated from solution by raising the pH to over 9 to form a zinc oxide or electrowon from solution to form a zinc cathode.

In another embodiment, the gaseous metal chloride containing product is treated to recover the metal chloride or chlorides by a condensation process.

In this embodiment, the gaseous metal chloride containing product emerging from the reactor is passed to a condenser and cooled to below the vaporisation temperature of the metal chloride to be recovered. In one embodiment, a series of condensers is provided, each operating within a defined temperature range to enable fractional condensation of different metal chlorides produced by treatment of the slag waste with gaseous chloride. Typically, the condensers operate in series with a decreasing temperature gradient across them. In this way, uncondensed gases from the first condenser are passed to a second condenser cooled to a lower temperature than the first condenser so as to condense a different metal chloride and so forth.

Following condensation of the volatile metal chlorides, the waste gas steam leaving the condenser or condensers will desirably be cleaned to further recover metals through a spray condensation unit prior to discharge to the atmosphere. Desirably, sulfur dioxide gas generated by the oxidation of sulfide minerals is recovered in the first reactor and this can be converted into sulfuric acid as a commercially valuable by-product.

In one embodiment, the condensed metal chloride product or products of the recovery process may be further refined to extract the metal itself. Suitably, the condensed metal chloride will be solubilised and the metal recovered by direct precipitation, solvent extraction electro winning or electrolysis with the gaseous chloride agent being regenerated for reuse.

An apparatus for use according to an embodiment of the process of the invention is illustrated schematically in FIG. 1. FIG. 1 shows a fluidised bed reactor (2) into which a smelter slag may be fed. Gaseous chloride is introduced to the fluidised bed through an inlet (5) at the base of the fluidised bed reactor and the gas recirculated through the fluidised bed reactor by means of a circulation pump (1). Gaseous metal chloride produced by passing the steam of gaseous chloride through the fluidised bed is passed to a condenser (3) and collected. Exhaust gases are expelled from the condenser through an outlet (4) and may be cleaned prior to discharge to the atmosphere.

Throughout the description and claims of this specification, the words "comprise" and "contain" and variations of the words, for example "comprising" and "comprises", mean "including but not limited to", and do not exclude other moieties, additives, components, integers or steps. The singular encompasses the plural unless the context otherwise requires. In particular, where the indefinite article is used, the specification is to be understood as contemplating plurality as well as singularity, unless the context requires otherwise.

Preferred features of each aspect of the invention may be as described in connection with any of the other aspects.

Generally speaking the invention extends to any novel one, or any novel combination, of the features disclosed in this specification (including any accompanying claims and drawings). Thus features, integers, characteristics, compounds, chemical moieties or groups described in conjunction with a particular aspect, embodiment or example of the invention are to be understood to be applicable to any other aspect, embodiment or example described herein unless incompatible therewith. Moreover unless stated otherwise, any feature disclosed herein may be replaced by an alternative feature serving the same or a similar purpose.

The process of the invention is further illustrated by the following non-limiting example.

EXAMPLE

Lead smelter slag, containing over 5% wt/wt, was fed with no additional preparation to a fluidised bed reactor at 900° C. The fluidised bed was maintained with compressed air to ensure a homogenous bed and the temperature was maintained by external elements due to the laboratory scale of the test. Pre-formed hydrochloric gas was then fed into the fluidised bed where it reacted instantaneously with the slag. The hydrochloric gas preferentially converts the entrapped zinc, copper and residual lead into metal chlorides that are then volatilised from the bed. Tests show that in excess of 90% of the zinc was extracted and similar values were obtained for both the copper and lead. The volatilised metal chlorides were then condensed to solids and collected for refining into saleable metal products. The test indicated a retention time of 4 hours and an optimum usage of hydrochloric gas equivalent to 125% of the estimated stoichiometric demand of the zinc alone.

The invention claimed is:

1. A process for recovering a metal chloride or mixed metal chloride from a solid waste material comprising recoverable metal containing constituents produced by lead, copper or zinc smelting and refining processes, said process comprising the steps of:
   (i) heating the solid waste material in an oxidizing environment to form a heated solid waste material;
   (ii) treating the heated material with a gaseous chloride to form a gaseous metal chloride containing product; and
   (iii) treating the gaseous metal chloride containing product of to recover the metal chloride or mixed metal chloride.

2. A process according to claim 1 wherein the solid waste material is heated in a fluidised bed.

3. A process according to claim 1 wherein the gaseous chloride is gaseous ammonium chloride or hydrogen chloride gas.

4. A process according to claim 3 wherein the hydrogen chloride gas is prepared by electrolysis of a brine solution to produce hydrogen and chloride gases which are then combined.

5. A process according to claim 4 wherein sodium hydroxide is produced as a by-product.

6. A process according to claim 1 wherein the solid waste material is heated to a temperature of 700-1600° C.

7. A process according to claim 1 wherein in step (ii) the gaseous chloride is recirculated over the heated solid waste material of step (i).

8. A process according to claim 1 wherein chlorides of more than one metal are recovered.

9. A process according to claim 1 wherein the solid waste material is combined with a sulfide mineral.

10. A process according to claim 9 wherein sulphur dioxide is generated as a by-product on heating the sulphide sulfide mineral.

11. A process according to claim 1 wherein any gaseous chloride remaining after step (iii) is passed through a gas scrubbing unit.

12. A process according to claim 1 wherein the metal chloride is a chloride of a metal selected from zinc, iron, copper, silver, gold, nickel, molybdenum, indium, tin, gallium or germanium.

13. A process according to claim 1 wherein in step (iii) the metal chloride or mixed metal chloride is recovered by quenching the gaseous metal chloride containing product of step (ii) with water to produce an aqueous solution of the metal chloride or mixed metal chloride.

14. A process according to claim 13 wherein the pH of the aqueous solution is adjusted to precipitate the metal in the form of a basic compound.

15. A process according to claim 13 wherein any iron present is precipitated in the form of a basic compound by adjusting the pH of the aqueous solution to a pH in the range of from 2 to 4.

16. A process according to claim 13 wherein copper metal is precipitated by adding zinc to the aqueous solution.

17. A process according to claim 15 wherein zinc is precipitated in the form of a basic compound by adjusting the pH of the aqueous solution to a pH of greater than 9.

18. A process according to claim 1 wherein in step (iii) the metal chloride or mixed metal chloride is recovered by condensing the gaseous metal chloride containing product.

19. A process according to claim 1 wherein the recovered metal chloride or mixed metal chloride is further treated to extract the metal.

20. A process according to claim 18 wherein the recovered metal chloride or mixed metal chloride is further treated to extract the metal by electro-winning or electrolysis.

\* \* \* \* \*